F. TIRELLI.
AUTOMOBILE JACK.
APPLICATION FILED MAY 21, 1913.
1,090,430.
Patented Mar. 17, 1914.
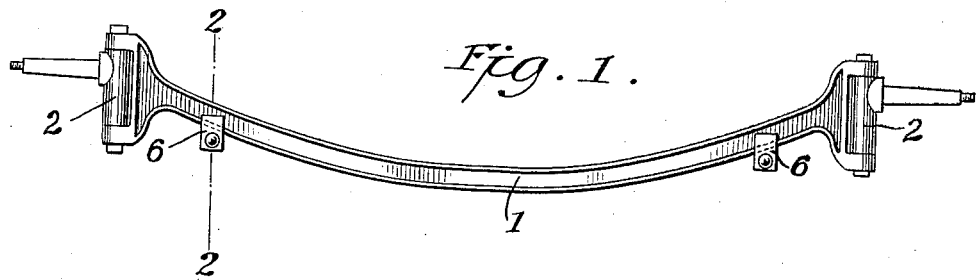
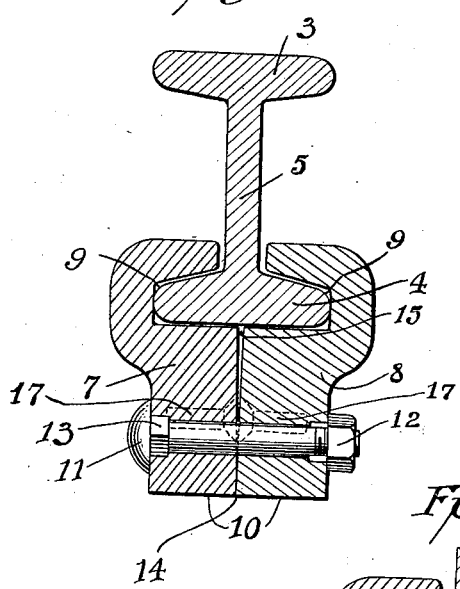
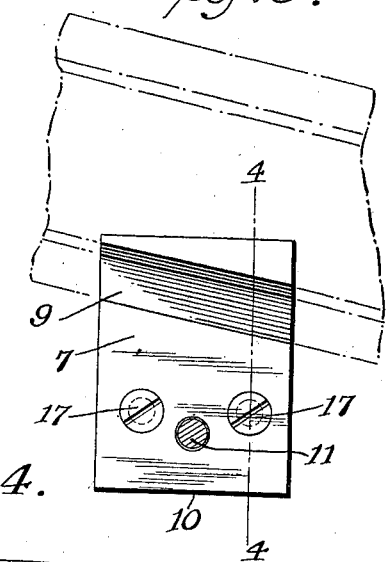
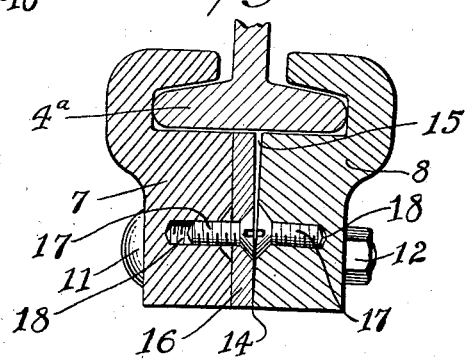
Witnesses:
Frank Tirelli, Inventor,
By his Attorney
Phillips Abbott.

UNITED STATES PATENT OFFICE.

FRANK TIRELLI, OF NEW YORK, N. Y.

AUTOMOBILE-JACK.

1,090,430.

Specification of Letters Patent. Patented Mar. 17, 1914.

Application filed May 21, 1913. Serial No. 768,920.

*To all whom it may concern:*

Be it known that I, FRANK TIRELLI, a citizen of the United States, and a resident of the borough of Manhattan, city, county, and State of New York, have invented a new and useful Device for Use in Connection with Automobile-Jacks, of which the following is a specification, reference being had to the accompanying drawings.

The axles of many vehicles made at the present day, particularly pleasure and commercial automobiles, are made of so-called I beams or I iron, and as usually constructed they curve downwardly or "dip", as it is called, in their central portion, so that the ends of each axle adjacent to the part which engages with the wheel is higher than the central portion. The result of this is that the ends of the axle are at a greater or less angle relative to a horizontal line, so that the flat lowermost plate or flange of the I beam presents an inclined surface and it is with this surface that the automobile jack usually engages when by reason of a punctured tire or for any other cause, it is necessary to jack up the car that repair or appropriate manipulation may be effected, and in as much as the jack must be placed in a practically vertical position in order to properly support the load imposed upon it, the head of the jack necessarily engages with the inclined under plate or flange of the I beam referred to, and it frequently happens, especially if any one remains in the car during the manipulations described, that his movements will occasion some tremor or perhaps more pronounced movement on the part of the car, thus resulting in a slipping of the head of the jack upon the inclined surface of the axle with which it engages and a dropping of the axle, perhaps resulting in more or less serious injury to the car or to the chauffeur.

It is the purpose, therefore, of this invention, to provide an inexpensive device adapted to permanent attachment to the axle of the car or to be removable therefrom and used only as occasion may require, whereby a flat horizontal surface will be provided with which the head of the jack may make secure and reliable engagement, thus avoiding the dangers referred to.

In the drawings Figure 1 is an elevation of a front axle of an automobile showing the invention applied thereto; Fig. 2 is a vertical sectional view on the line 2—2 of Fig. 1; Fig. 3 is an enlarged elevation of the invention, the axle being broken away; Fig. 4 is a vertical elevation of that shown in Fig. 3 taken on the line 4—4 of that figure.

1 represents the front axle of an ordinary passenger automobile. It is made from a suitably formed I beam as shown, the ends of which are fashioned to receive the steering knuckles 2, 2, and as shown in Fig. 2 the axle is composed of an upper horizontal member or flange 3 and a lower similar flange 4 connected by the usual web 5.

6, 6, see Fig. 1, are the clamp devices which form the subject matter of this invention, shown in the example here presented as permanently attached to the axle. These clamps (see Figs. 3 and 4) are made in two parts, 7 and 8, each of which is made in the form of a jaw as shown, their upper parts being recessed as at 9, 9, to receive the lower flange or plate of the I beam axle. These recesses 9, 9, are diagonally arranged, that is to say, made at an angle relative to the horizontal line, as shown best in Fig. 3, so that when applied to the axle, they will conform to its inclined position and present a lower surface 10 in a horizontal plane. The two jaws 7 and 8 are clamped together by a bolt 11 provided with a nut 12 which passes loosely through both of the jaws and is provided with a squared portion 13 which engages in a similarly shaped recess made in each of the jaws so as to prevent turning of the bolt during the threading of the nut. This bolt, as stated, works loosely through the hole made in the jaws for its reception so that the same clamp can be used at either the right or left hand end of the axle, as preferred, and the bolt reversed in position so that the nut 12 may be on the inside or outside of the axle as may be most convenient. The looseness of fit between the holes in the jaws and the bolt also allows some play, so that the jaws may properly adjust themselves and thus secure better clamping action on the axle.

It will be noted by reference to Figs. 2 and 4 that the jaws of the clamp are so formed relative to the width of the lower flange of the axle that when the lower ends of the jaws touch one another as shown at 14 there will be a space 15 left between them at or near the flange or lower plate of the axle so that a good squeezing action may be exerted upon the edges of the flange, as illustrated in Figs. 2 and 4, or upon the web of the I beam, as the case may be, so that the clamp will be held firmly in place.

In order that the clamps may be adapted to axles of different size, in other words, those in which the lower flange or plate 4 differs in width, I provide means whereby one, or if desired both of the jaws may be thickened in their lower part. This construction is illustrated in Fig. 4. It will be there seen that the lower flange of the I beam marked in this figure 4ª is somewhat wider than that in Fig. 2 and to compensate for this, an additional plate 16 has been attached to the jaw 7 and securely held there by two screws 17, 17, see particularly Fig. 3. The screws are of the ordinary machine screw type, that is to say, substantially parallel sided threads threaded into a parallel sided threaded hole 18 made in the jaw 7 and when the plate 16 is not required, the screws are run fully home so that their heads are flush with the surface of the jaw as illustrated best in Fig. 2, but when it is desired to increase the thickness then the screws are run back and the plate 16 which of course has been fitted to the jaws and provided with appropriate countersunk screw holes, is fastened in place as shown in Fig. 4.

I prefer to furnish both the jaws with screws 17 as illustrated best in Fig. 4, so that the plate 16 may be applied to the right or left hand jaw as may be found most convenient and sometimes it will be desirable to apply a plate to each jaw. Obviously the plate 16 may be made of such thickness as desired.

The clamps may be permanently attached to the axles, remaining thereon as a fixed part of the running gear or may be carried in the car tool box, or otherwise, as preferred, and applied only as occasion may require. This is a very feasible matter because the cost of the clamps is small and owing to the interchangeable character of the parts above described, whereby the same clamp is adapted to use at either end of the axle, a single clamp only need be carried.

It will be obvious to those who are familiar with such matters that modifications may be made in the details of construction of the device without departing from the essentials of the invention. I therefore do not limit myself to such details.

I claim:

1. As a new article of manufacture a detachable jack support for automobile axles comprising two separable jaws each diagonally recessed near one end and adapted to receive the lower flange of an I-beam axle between them, a bolt which passes through the jaws below the recesses adapted to force them together, the lower faces of the jaws projecting downwardly below the axle and presenting a substantially horizontal surface for the head of the jack.

2. As a new article of manufacture a detachable jack support for automobile axles comprising two separable and counterpart jaws each diagonally recessed near one end and adapted to receive the lower flange of an I-beam axle between them, each being perforated near its other end and a bolt adapted to loosely pass through the perforations and to force the jaws together, the lower faces of the jaws projecting downwardly below the axle and presenting a substantially horizontal surface for the head of the jack.

3. As a new article of manufacture, a detachable jack support for automobile axles comprising two jaws each so recessed near one end as to adapt them to grip the axle between them and to maintain the support in a vertical position upon the axle, each jaw being perforated below the axle and near its other end and a bolt loosely engaging in said perforations so that it shall be adapted to force the lower end of the jaws in contact with each other and their upper ends into crowding contact with the axle, the lower faces of the jaws projecting downwardly below the axle and presenting a substantially horizontal surface for the head of the jack.

4. As a new article of manufacture a detachable jack support for automobile axles comprising two jaws adapted to grip the axle between them, a bolt passing through the jaws below the axle and adapted to force them together, a thickening plate adapted to be fastened to one of the jaws and means for holding the plate to the jaw.

5. As a new article of manufacture a detachable jack support for automobile axles comprising two jaws adapted to grip the axle between them, a bolt loosely passing through the jaws below the axle and adapted to force them together, a thickening plate adapted to be fastened to one of the jaws, threaded and countersunk holes in the jaws adapted to receive screws for fastening the thickening plate thereto and threaded screws adapted to work in the threaded holes having heads adapted to enter the countersinks in the jaw whereby they may be made flush with the surface of the jaw when the thickening plate is present.

In testimony whereof I have signed my name to this specification in the presence of two subscribing witnesses.

FRANK TIRELLI.

Witnesses:
PHILLIPS ABBOTT,
T. M. DOUSBACH.